(12) United States Patent
Thompson et al.

(10) Patent No.: US 6,687,579 B2
(45) Date of Patent: Feb. 3, 2004

(54) FLEXIBLE AND FAULT TOLERANT NETWORKED STEERING SYSTEM

(75) Inventors: Eldon J. Thompson, Ruckersville, VA (US); Ronald K. Richey, Charlottesville, VA (US); Johann-Peter Hoelting, Hamburg (DE); Hayo Steiger, Dassendorf (DE); Uwe Gerhard Oldekop, Hamburg (DE)

(73) Assignee: Northrop Grumman Corporation, Woodland Hills, CA (US)

( * ) Notice: Subject to any disclaimer, the term of this patent is extended or adjusted under 35 U.S.C. 154(b) by 58 days.

(21) Appl. No.: 10/187,731

(22) Filed: Jul. 2, 2002

(65) Prior Publication Data

US 2003/0045975 A1 Mar. 6, 2003

Related U.S. Application Data

(60) Provisional application No. 60/316,117, filed on Aug. 30, 2001.

(51) Int. Cl.[7] .................................................. G01S 3/14
(52) U.S. Cl. ........................... 701/21; 701/41; 114/162
(58) Field of Search .............................. 701/21, 23, 24, 701/26, 207, 213, 210, 209, 208, 41; 114/44 R, 151, 162; 440/38, 39, 40, 51, 53

(56) References Cited

U.S. PATENT DOCUMENTS

| | | | | |
|---|---|---|---|---|
| 5,523,951 A | * | 6/1996 | Kriesgman et al. ........... | 701/21 |
| 5,809,457 A | * | 9/1998 | Yee et al. .................... | 701/220 |
| 6,230,642 B1 | * | 5/2001 | McKenney et al. ......... | 114/150 |
| 6,273,771 B1 | | 8/2001 | Buckley et al. | |
| 6,604,479 B2 | * | 8/2003 | McKenney et al. ..... | 114/144 R |

FOREIGN PATENT DOCUMENTS

EP              0 035 859        *   9/1981

* cited by examiner

Primary Examiner—Richard M. Camby
(74) Attorney, Agent, or Firm—Seymour Levine; Michael H. Wallach

(57) ABSTRACT

A marine vessel steering system having a bus to which an autopilot interface unit (AIU) containing an autopilot function is coupled. The system having at least one steering location at which autopilot function controls are positioned and coupled through a cable (bus) interface unit (CIU) to the bus for communication with the AIU. In the event that more than one steering location seeks access to the bus, priority is established by an arbitration procedure between data frames transmitted from each steering location. A manual steering unit, such as a helm, is positioned at the main steering location and directly coupled to the AIU, wherein a switch selects between autopilot function rudder control and helm rudder control. Miniwheels, which operate in a manner similar to that of a helm, are positioned at steering locations remote to the main steering location which communicate with the AIU to switch between autopilot function control to miniwheel control. A multiplicity of AIUs may be utilized to maintain operation with a minimum of disruption should an AIU fail by switching from the failed unit to one of the other AIUs. Marine vessels containing more than one rudder have an AIU respectively associated with each rudder. Through a master/slave arbitration procedure one AIU is established as the master and the others as the slaves. After the master/slave relationship is establish, the master provides all data for rudder control.

17 Claims, 6 Drawing Sheets

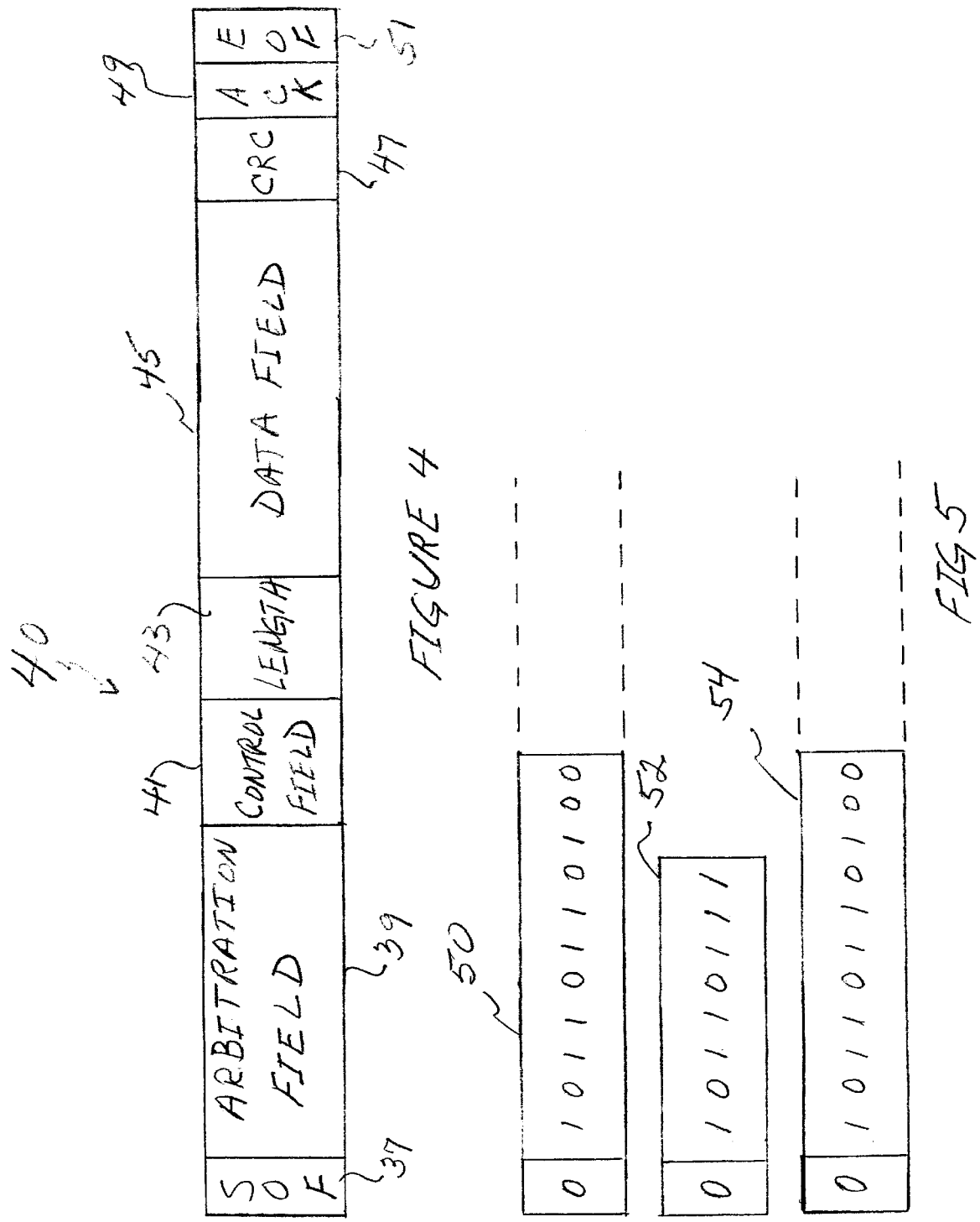

FLEXIBLE AND FAULT TOLERANT NETWORKED STEERING SYSTEM

The priority benefit of Provisional Application Ser. No. 60/316,117 filed Aug. 30, 2001 is claimed by this application.

BACKGROUND OF THE INVENTION

1. Field of the Invention

The invention pertains to the field of ship's steering systems and more particularly to reducing the wiring between steering control units of such systems and the steering mechanisms.

2. Description of the Prior Art

Ship maneuvering and course control have advanced over the years from the tiller control of the rudder to present day autopilots. Traditionally a bridge has been the command center of the ship and control functions have been performed at this location. Large ships of the present day, however, may have command stations remote from the bridge which provide better visibility for certain maneuvering situations such as harbor navigation and ship docking. Should visibility from the bridge be impaired, the control of the ship may be passed to the remote station best located for the necessary maneuvers. These remote stations are hard wired to the steering system and switching is performed with multiple deck switches and numerous electromechanical relays.

A typical steering system includes two remote command centers, an autopilot, helm, and tiller steering modes, and a mode selector switch. These systems are custom built, complex, wiring intensive, and expensive to design and build. Steering systems are a very low volume product and each customer has unique requirements and constraints. Because of the unique requirements and constraints, building complete units in advance to provide an inventory is not cost effective. Such an approach invites multiple handling of the same equipment to satisfy the customer requirements, thus increasing the cost of manufacture. Prior art designs rely on labor intensive discrete wire connections and custom wiring diagrams to satisfy customer requirements. Such an approach provides a system, which in addition to being expensive to design and build, lacks modification flexibility.

SUMMARY OF THE INVENTION

In accordance with the present invention a steering system for a ship includes a bus architecture which reduces the complexity of the system component interconnections and provides for incorporating new components and additional steering command centers. The system includes a helm wheel for follow-up steering control, a non follow-up steering control unit (NFU), and three types of devices that may be attached to the bus: Autopilot Display Units (ADU), Autopilot Interface Units (AIU), and Bus Interface Units (BIU). An ADU displays the autopilot settings and other pertinent data in addition to containing the autopilot control functions. An AIU contains elements for bus initialization, station management, follow-up control, and the autopilot, while a BIU contains software which can be configured to perform a selected function. All three, ADU, AIU, and BIU contain the necessary software and hardware for coupling to the bus. Cable (bus) interface units (CIU) at each station allow for the coupling of a multiplicity of units (ADU, BIU) to the bus at the respective stations. Because the closed loop controller function is contained entirely within the AIU, bus latency is not a critical parameter. Only control parameters, which are not sensitive to latency effects of the bus, are sent from the ADU to the AIU. The helm wheel is not coupled to the bus but is directly coupled to a follow-up function in the AIU. The helm wheel may be selected for follow-up control and in the event of a bus failure may be selected to provide basic closed loop rudder control. The NFU is a mechanical lever which controls a voltage source that is coupled through a switch to directly apply control voltages to the solenoid activating rudder movement without any processor or bus intervention. The switch is positioned to select between autopilot control and NFU control. Since the NFU is located outside all of the bus and interface units, it acts as a complete backup to any catastrophic system failure.

A multiplicity of AIUs are provide. Should an AIU fail, the AIU functions are switched to another AIU and the system operation continues without further interruption.

On ships having more than one rudder, at least one AIU is employed for each rudder. The AIUs, respectively associated with the rudders are employed in a master/slave relationship, the master being determined through arbitration of proprietary system messages. When the system is in the automatic control mode, heading order signals are received by the master which then computes the rudder order and relays this information to the slave units. When the system is in a non-automatic control mode, each AIU receives its own helm order, whether from the helm on the bridge or from elements at remote locations from which it determines the rudder order for its associated rudder. Should the master fail, a new mastership is established by a re-arbitration among the remaining AIUs using the proprietary system messages.

The invention will now be described in greater detail with reference to the accompanying drawings.

BRIEF DESCRIPTION OF THE DRAWINGS

FIG. 4 is an illustration of a Data Frame that may be used by a steering system.

FIG. 5 is an illustration of an arbitration field in a data frame and is useful for explaining the arbitration procedure.

DESCRIPTION OF THE PREFERRED EMBODIMENTS

Figure 1:
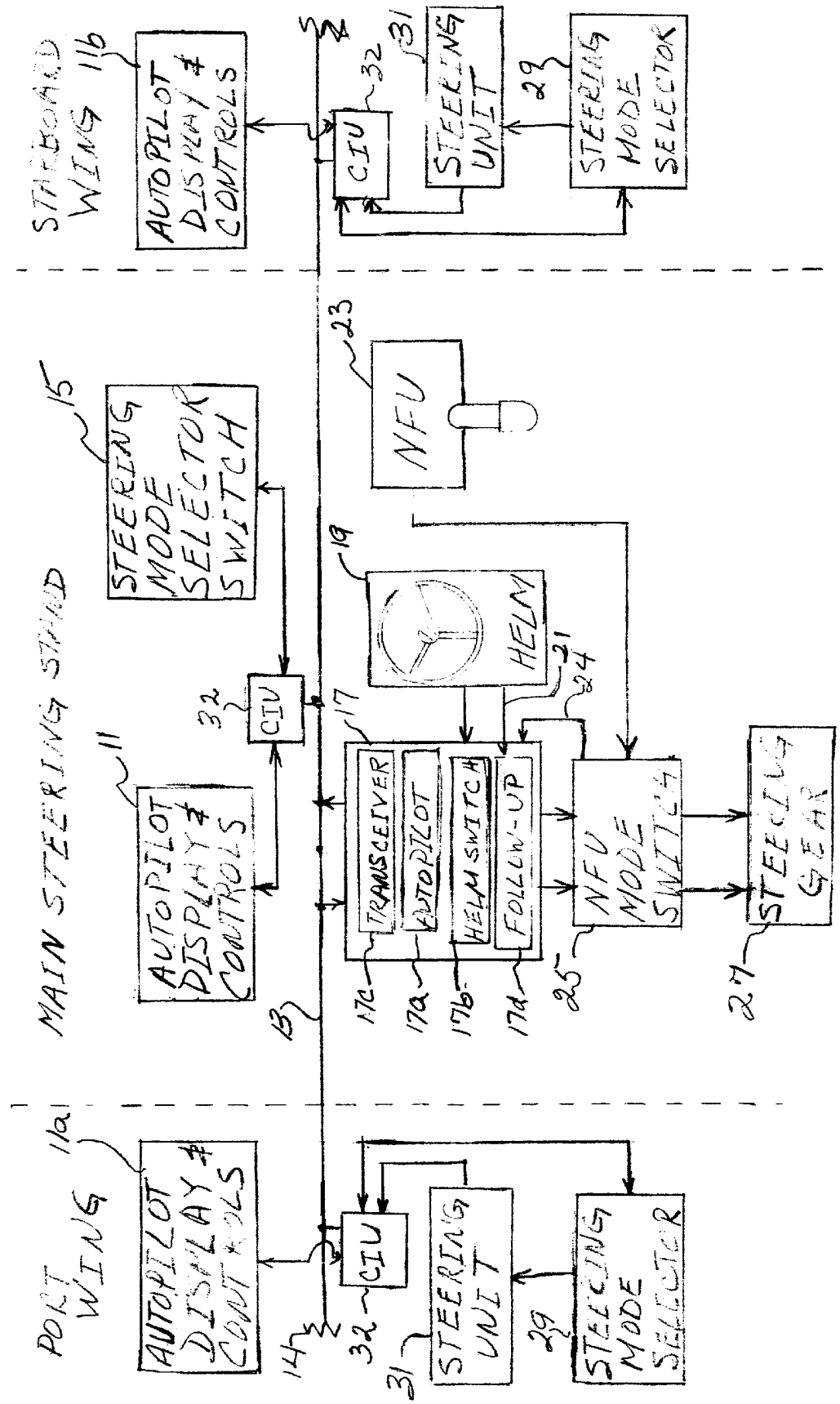
FIG. 1 is a block diagram of a preferred embodiment of the invention

Refer now to FIG. 1 wherein a flexible steering system for a ship is shown. On ships having a single command station the components shown under Main Steering Stand comprise a complete system. An autopilot display unit (ADU) 11, with autopilot control functions thereon, is coupled to a bus system 13, which is terminated at the ends with resistors 14, or other appropriate termination, through which digital command signals are transmitted. Also coupled to the bus is an electronic mode selector switch 15 which, as will be shown, can be replaced with a mechanical switch that communicates with an autopilot interface unit (AIU) 17 to switch the steering function, via a helm switch 17b in the AIU 17, between an autopilot function 17a, contained within the AIU, which maintains a heading set at the operator controls, and a follow-up function 17d which receives orders from a helm 19 from which rudder orders are computed. Communication with the bus is through a transceiver 17c in the AIU 17 and similar transceivers in all the bus coupled system elements. The AIU 17 may be switched to helm control by a signal from a mode selector switch 15, which may be mechanical or electronic. As shown in FIG. 1,mode selector switch 15 is electronic and coupled to the AIU 17, via the bus 13.

In the event of a bus failure switching from autopilot operation to helm operation would not be possible through the bus. To guard against such a situation, a mechanical switch 33 directly coupled to the AIU 17 may replace the electronic switch as shown in FIG. 2.

Figure 2:
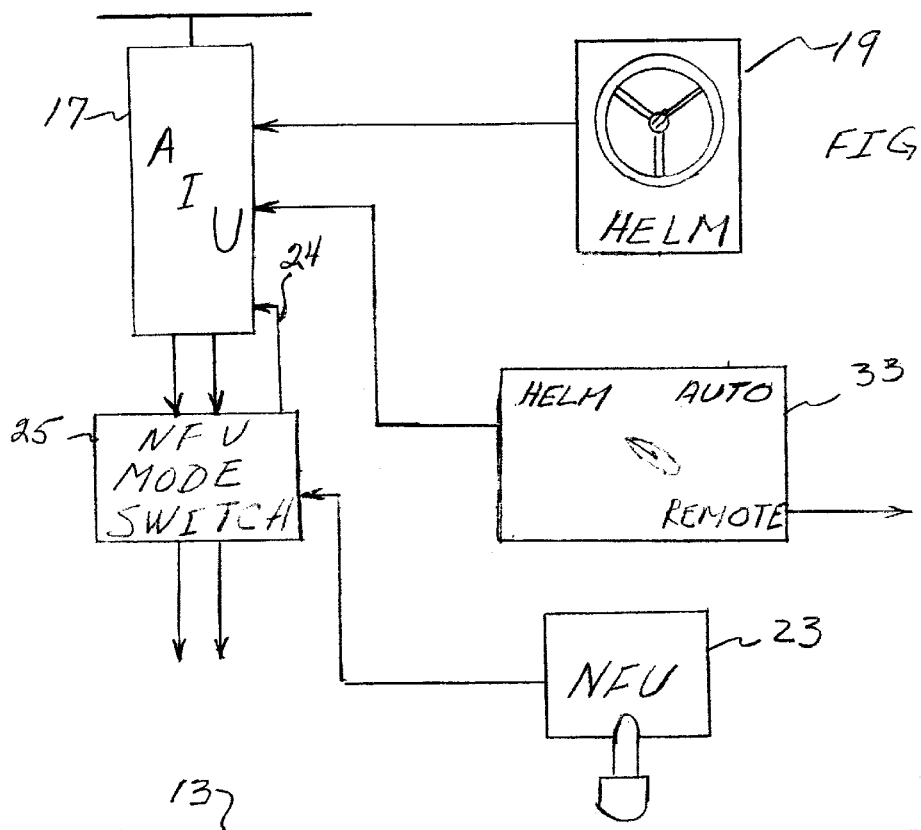
FIG. 2 is a diagram indicating mode selection with the use of a mechanical switch.

Referring now to FIG. 2 with continued reference to FIG. 1. In the figures like elements bear the same numerical designation. Also included in the system is a non follow-up (NFU) control function 23. Control of the NFU function 23 may be a mechanical lever, such as a tiller, connected to a NFU mode selector switch 25 which, when positioned for NFU operation, directly applies rudder control signals from the NFU to the steering gear 27 without any processor or bus intervention. When positioned for NFU operation the NFU mode selector switch 25 also sends a status signal, via line 24, to the AIU 17. This signal informs the AIU of the NFU takeover and disables the automatic pilot function 17a and the follow-up function 17d, preferably by placing these functions in stand-by. Since the NFU is located outside all of the bus and interface units, it acts as a complete backup to the system should a catastrophic failure occur to the system.

Refer now to FIG. 2 wherein the utilization of a mechanical mode selector switch is illustrated. A mechanical mode selector switch 33 located at the Main Steering Stand, typically includes three positions: auto, helm, and remote. When mode selector switch 33 is in the auto position the autopilot function 17a in the AIU 17 is the selected steering mode, when in the helm position the autopilot function 17a is by-passed in favor of the follow-up function 17d for helm steering, and when in the remote position, operation of the steering system is passed to a remote location, as will be explained.

Referring again to FIG. 1 with continued reference to FIG. 2, should the ship require command centers at locations remote to the main steering stand located on the bridge, such as at the port and starboard wings, the bus may be extended to the selected locations and system elements coupled thereto to provide the desired steering functions. Since only one of the command centers may be in control at a time, a selection system, yet to be described, must be provided. These remote stations may have ADUs 11a and 11b, respectively, that provide the same display and controls as the ADU at the main steering stand. Steering mode selectors 29 and steering units 31 may also be coupled to the bus at the port and starboard remote locations. Steering units 31 may be miniwheels which operate in a manner similar to the helm operation and provide orders that are the same as the orders provided by the helm from which rudder positioning orders are computed. The steering mode selectors may be set to establish the autopilot or a miniwheel as the ships control device. It should be understood that additional elements, such as a steering alarm display and a dual rudder sync selector, for ships with dual rudders, may also be coupled to the bus at any location. Coupling to the bus may be through cable (bus) interface units (CIU) 32 located at each location. These units are directly coupled to the bus and provide a multiplicity of terminals through which a multiplicity of elements may be coupled to the bus at any location.

Should more than the three steering locations as shown in FIG. 1 be required, the bus 13 may be extended to all additional selected locations. The controls at these additional locations may duplicate the controls shown at the port and starboard wings in FIG. 1. These additional locations may also have other elements coupled to the bus thereat, including the alarm display and dual rudder sync selector mentioned above.

Figure 3:
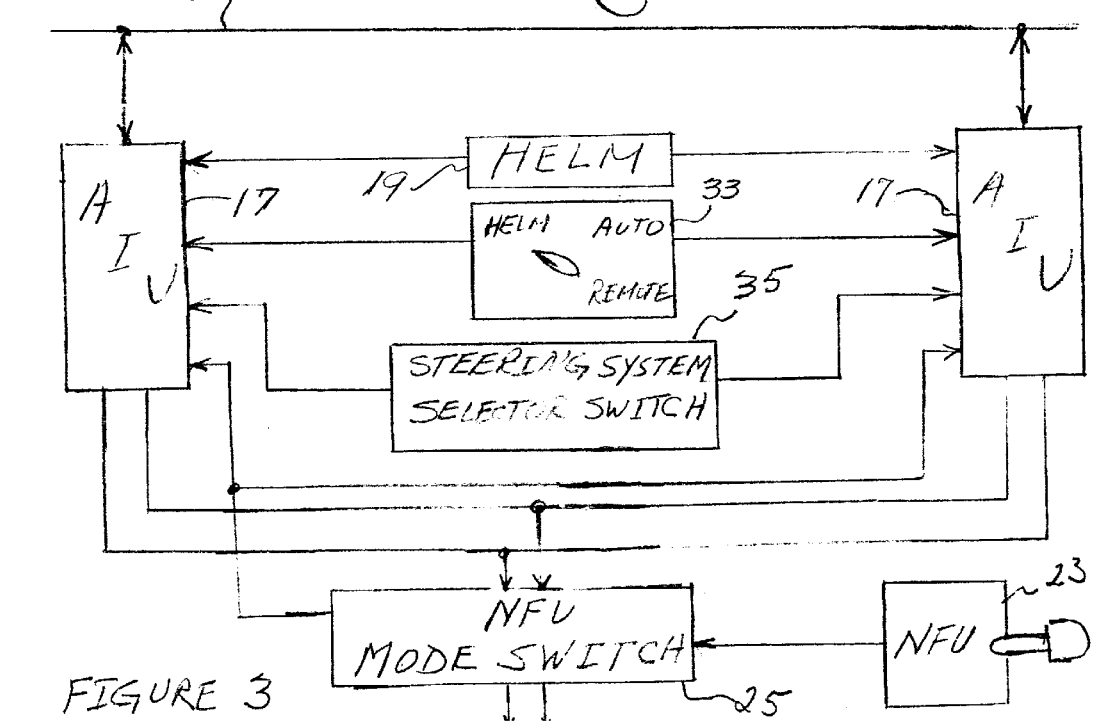
FIG. 3 is an illustration utilizing two AIUs.

When a failure of the automatic pilot function occurs it is not always desirable to place the steering system in the helm or NFU modes. The effects of such a failure are minimized with the addition of a second AIU 17, as shown in FIG. 3. Two AIUs 17, each containing an autopilot function 17a are coupled to the bus 13. The helm 19 is coupled to both AIUs, as previously described. A steering system selector switch 35 provides for the selection of one of the AIUs 17. After the AIU has been chosen, the steering system operates in a normal manner.

The bus may be in one of two states; dominant state, when driven by a transmitter, or recessive state, when no transmitter has driven it to the dominant state. If two or more transmitters try to access the bus simultaneously, a bit-wise non-destructive arbitration procedure resolves the potential conflict with no loss of data or bandwidth. This feature allows resolution of transmission collisions without loss of throughput or resending of data by the higher priority mode. All units coupled to the bus 13 have transmitters which transmit Data Frames, yet to be described, and contain software to assess access priority to the bus. All receivers on the bus synchronize to the transition from recessive to dominant represented by the transmission of a Start of Frame bit. An identifier and at least one arbitration bit, together, form an Arbitration Field. The Arbitration Field is used to facilitate bus access. When a unit transmits, it also monitors what it sends to ascertain that the data on the bus is the same as that from the transmitter. If a unit, in the process of transmitting a recessive bit, receives a dominant bit, it stops transmitting. When two transmitters are transmitting dominant bits, the arbitration field in the Data Frames are compared by the software in each unit and the one with the higher priority indicated in the arbitration field of the Data Frame prevails and the other ceases to transmit.

FIG. 4 is an illustration of a Data Frame 40 that may be employed. A Start of Frame field 37 signifies that data is about to be sent and if the bus mode is in the recessive state it is switched to dominant state to allow transmission of data. An Arbitration field 39 following the Start of Frame field identifies the sender and contains the priority bit for the determination of priority, should data from another transmitter be simultaneously on the bus. A Control field 41 contains a fixed number of bits preceding a Length field 43 which specifies the number of bytes contained in the Data field 45. At the conclusion of the data field, a CRC field 47 contains a cyclic redundancy check word which is used to detect frame errors. This word is computed from the bits that precede it and are used to prevent a faulty transmission from disrupting the bus. Following the CRC field 47 is an Acknowledgment field 49 which is utilized to determine whether at least one receiver heard the transmission. Finally, the Data Frame 40 concludes with an End of Frame field 51, signifying that the frame has concluded.

Priority between two transmissions on the bus is resolved by bitwise arbitration in the arbitration field. An Arbitration Field 50 in a Data Frame may be as shown in FIG. 5. In performing this arbitration a "0" may be chosen as dominant over a "1", though a "1" as dominant over a "0" may also be chosen. In the example shown in FIG. 5 a "0" is dominant over "1". In the example the Arbitration Field 50 is compared with the Arbitration Field 52 in the Data Frames of two simultaneous transmissions. The first seven bits in the two Arbitration Fields are the same and the comparison continues to the eighth bit, whereat the Arbitration Field 50 contains a "0" while the Arbitration Field 52 contains a "1". Since the "0" is dominant, the unit transmitting the Arbitration Field 52 stops transmitting and the unit transmitting the Arbitration Field 50, indicated in the figure as Arbitration Field 54, is the dominant unit and continues to transmit.

In ships having more than one rudder at least one AIU is coupled to each rudder. These AIUs are employed in a master/slave relationship, as will be explained.

Figure 6:
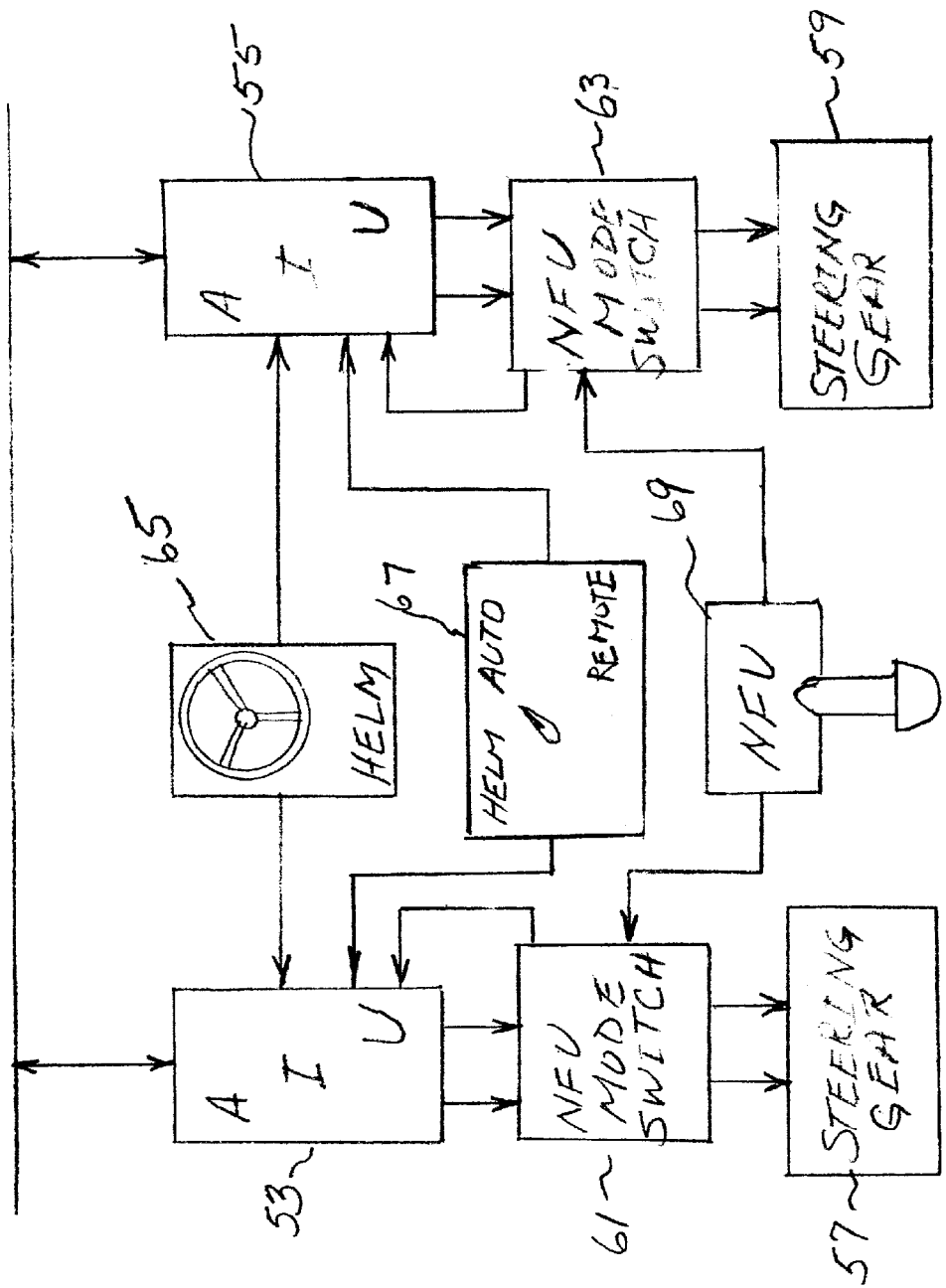
FIG. 6 is a block diagram of a two rudder system.

In FIG. 6 a configuration is shown which may be utilized on a ship having two rudders. AIU 53 and AIU 55 are respectively coupled to steering gear 57 and 59 via NFU mode switch 61 and NFU mode switch 63. When in the automatic mode, one of the AIUs, through arbitration of proprietary messages, claims mastership. The master then receives heading order signals, computes the rudder orders, and relays these orders to the slave station. Both AIUs are directly coupled to the helm 65 and independently compute the rudder orders when in the helm mode. As previously mentioned, should a catastrophic failure occur the system is placed in the NFU mode by actuating the NFU switch 69, thereby coupling the NFU to the steering gears 57 and 59, respectively. Though only one AIU is shown in FIG. 6 to be associated with a rudder, it should be recognized that a multiplicity of AIUs may be associated with each rudder. Should an operating AIU fail, one of the redundant units may then be activated and system operation can continue unabated.

Figure 7:
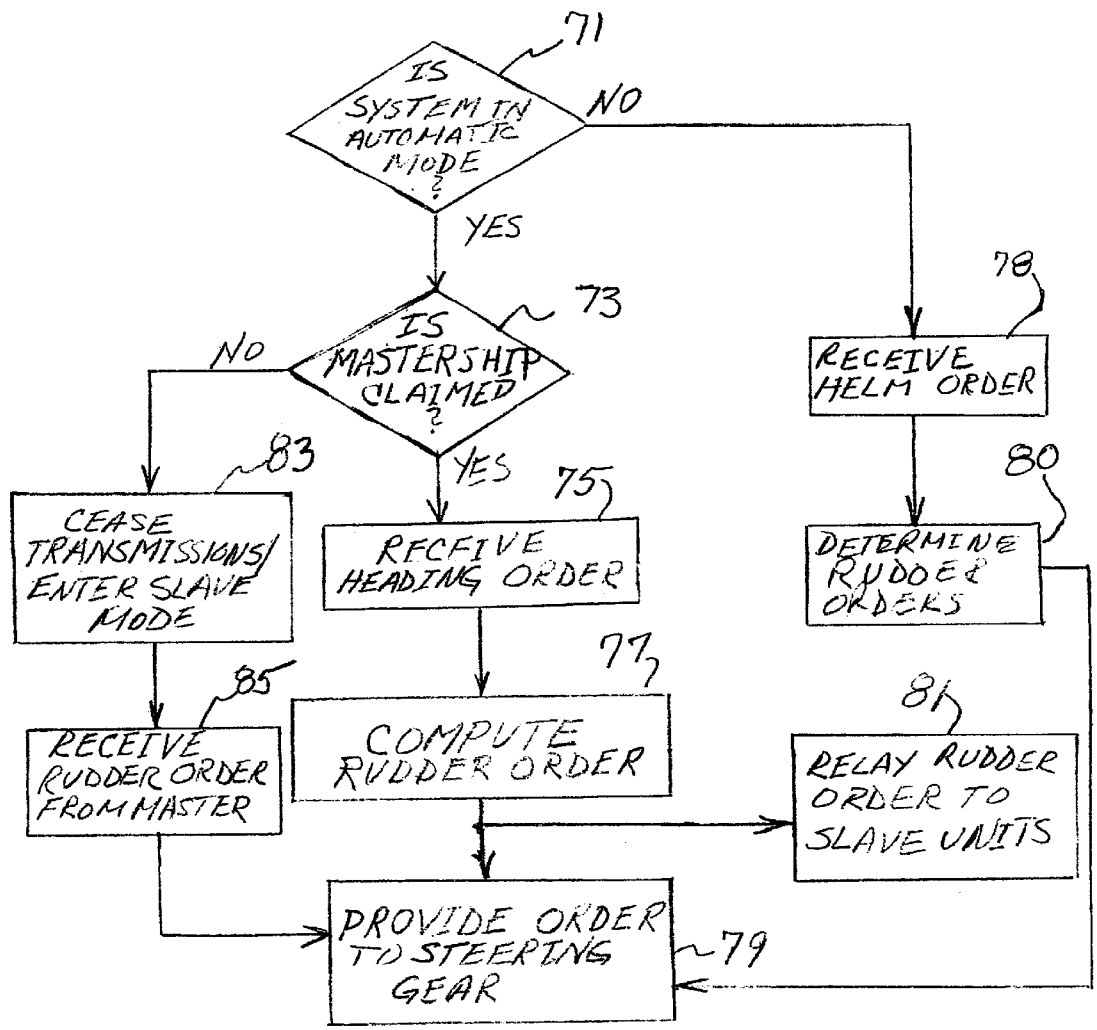
FIG. 7 is a flow chart useful for explaining the operation of a two rudder system.

A flow chart for the operation discussed above is shown in FIG. 7. When a determination that the system is in the automatic mode 71, the AIUs arbitrate the mastership 73. The AIU which claims to be master receives the heading order 75, computes the rudder order 77, issues the order to its associated steering gear 79, and relays the order to the slave units 81. If mastership is not claimed, the AIU ceases to transmit and enters the slave mode 83. It is then ready to receive rudder orders from the master 85 and relay such orders to the steering gear 79 after entering the slave mode. If the system is not in the automatic mode, helm orders are received 78 from the helm or steering unit from which rudder orders are determined 80 and provided to the steering gear 79.

Figure 8:
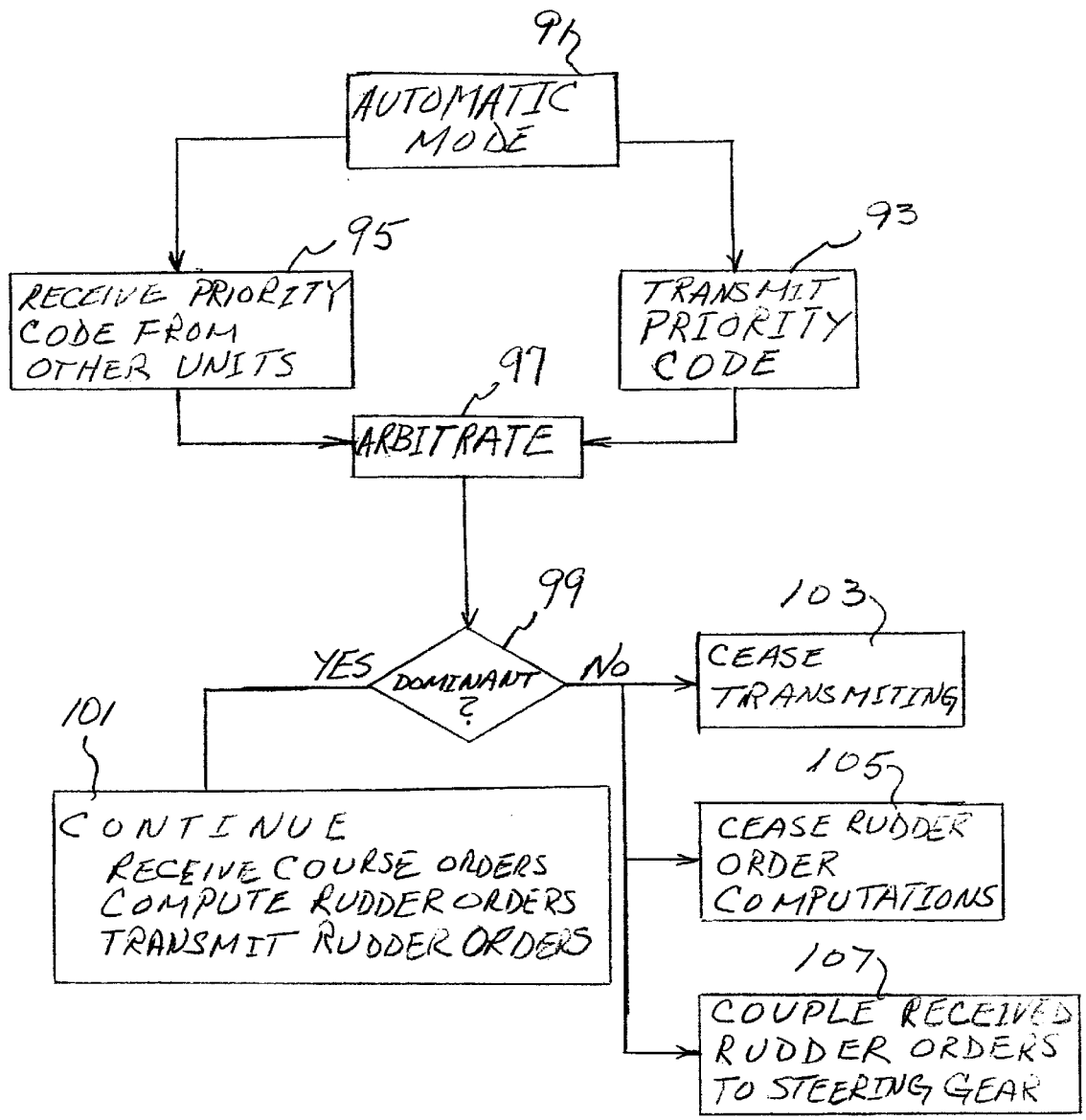
FIG. 8 is a flow chart useful for explaining the determination of the master/slave relationship between AIUs.

FIG. 8 illustrates the process of claiming mastership in decision block 73. With an automatic mode selection 91, each AIU transmits a priority code 93 and receives a priority code 95 from another AIU. The two priority codes are arbitrated 97, in a manner previously described, to determine that which is dominate 99. The one which is dominate continues full operation 101, receiving heading order signals, computing rudder orders, and transmits rudder order signals to the slave. The loser of the arbitration ceases to transmit, ceases rudder order computation, and couples rudder order signals received from the master to the steering gear 103.

While the invention has been described in its preferred embodiments, it is to understood that the words that have been used are words of description rather than limitation and that changes may be made within the purview of the appended claims without departing from the true scope and spirit of the invention in its broader aspects.

We claim:

1. A steering system for a marine vessel comprising:
   a communications bus;
   at least one autopilot interface unit (AIU) coupled to said communication bus, said AIU including:
      a transceiver coupled in a communications relationship with said communications bus;
      an autopilot function coupled to receive signals from said transceiver to maintain a set heading for said marine vessel;
      a helm switch, coupled to said autopilot function and a follow-up function for manual operation, through which autopilot or manual operation is selected;
   a steering unit, which provides manual heading control, coupled to said helm switch;
   a cable interface unit (CIU) constructed and arranged to couple at least one unit to be in a communication relationship with said communications bus;
   an autopilot control unit coupled to said CIU to communicate desired heading signals to said autopilot function via said communications bus and said transceiver; and
   a mode selector switch coupled to said helm switch, said helm switch responsive to switching signals from said mode selector switch for switching between said autopilot function and said steering unit.

2. A steering system in accordance with claim 1 further including an AIU selector coupled to each of said at least one AIU to select one of said at least one AIU for system operation.

3. A steering system in accordance with claim 1 further including:
   a non-follow-up steering control unit (NFU); and
   a NFU mode switch coupled to said NFU and said AIU to switch between NFU heading control and other heading controls contained within said AIU.

4. A steering system in accordance with claim 3 wherein said NFU heading control includes a tiller to control rudder positioning.

5. A steering system in accordance with claim 1 wherein said steering system includes a multiplicity of control locations, each location having at least one CIU for coupling elements to said communication bus.

6. A steering system in accordance with claim 1 wherein said steering system includes a main steering location and at least two steering locations remote to said main steering location, said at least two steering locations including a starboard steering location and a port steering location, said main steering location and said remote steering locations each including said autopilot control unit coupled via said CIU and said communication bus to said at least one AIU, said steering unit, and said mode selector switch.

7. A steering system in accordance with claim 6 wherein said steering unit at said main location is a helm.

8. A steering system in accordance with claim 6 wherein said steering unit at said remote steering locations is a miniwheel.

9. A steering system in accordance with claim 1 wherein said mode selector switch is coupled to said helm switch via said communication bus.

10. A steering system in accordance with claim 1 wherein said mode selector switch is a mechanical switch directly coupled to said helm switch.

11. A steering system in accordance with claim 6 wherein a unit at a location communicates via said bus utilizing a data frame including an arbitration field, said arbitration field containing sender priority data bits, said priority data bits being compared at a data frame sending location when transmissions from more than one location are on said bus to determine sender priority.

12. A steering system in accordance with claim 1 wherein said vessel has at least two rudders and said at least one AIU is at least two AIUs, each rudder being respectively associated with an AIU, said transceiver in said associated AIUs transmitting and receiving arbitration data frames for determination of a master-slave relationship between said associated AIUs, upon determination of master and slave said slave ceases rudder order computations and said master computes and provides rudder orders to said at least two rudders.

13. A method for steering a marine vessel having rudders for steering control comprising the steps of:
   providing a communications bus;
   coupling a heading order unit to said communication bus;
   coupling a receiver to said communication bus;
   transmitting heading orders generated by said heading order unit via said communication bus for reception by said receiver;
   transferring said heading orders from said receiver to a rudder order computation unit wherein rudder orders are computed consistent with said heading orders;
   supplying said rudder orders to a rudder control unit wherefrom rudder orders are given for positioning said rudders.

14. A method for steering a marine vessel in accordance with claim 13 wherein said rudder order computation unit includes an autopilot function which computes rudder orders for maintaining headings in accordance with said heading orders.

15. A method for steering a marine vessel in accordance with claim 14 further including further including the steps of:
   providing another autopilot function, thereby providing first and second autopilot functions;
   selecting one of said first and second autopilot functions for rudder order computations to provide a selected autopilot function; and
   coupling rudder orders from said selected autopilot function to said rudder order control unit.

16. A method for steering a marine vessel in accordance with claim 13 further including the steps of:
   providing a unit for manual control of a heading of said vessel;
   providing a selector switch coupled to said communication bus;
   supplying a switching unit in communication relationship with said selector switch via said communication bus, said selector switch responsive to signals from said switching unit for switching between said rudder order computation unit and said manual control unit;
   determining rudder orders from signals received from said manual unit when said selector switch is in said manual control unit position; and
   computing rudder orders in said rudder order computation unit when said selector switch is in said rudder order computation unit position.

17. A method of steering a marine vessel in accordance with claim 16 wherein said vessel has a multiplicity of rudders, each rudder respectively coupled to a computation unit, and further including the steps of:
   providing an associated transmitter and receiver for each rudder order computation unit coupled to said communication bus;
   determining that said selector switch is in said rudder order computation position;
   transmitting a priority message by each transmitter;
   receiving transmitted priority messages and arbitrating between own priority message and received priority messages to determine master-slave relationship;
   continuing rudder order computations by rudder order computation unit established as master;
   ceasing rudder order computations and transmissions by rudder order computation unit established as a slave; and
   providing rudder orders computed by said master to rudders associated with said slave.

* * * * *